United States Patent
Nedwed et al.

(10) Patent No.: US 12,181,455 B2
(45) Date of Patent: Dec. 31, 2024

(54) ADAPTIVE SEARCH MASS SPECTROMETER SPECTRAL ANALYSIS

(71) Applicant: John Wiley & Sons, Inc., Hoboken, NJ (US)

(72) Inventors: Karl Nedwed, Graz (AT); Michelle D'Souza, Wilmington, DE (US); Ty Abshear, Grand Junction, CO (US)

(73) Assignee: John Wiley & Sons, Inc., Hoboken, NJ (US)

( * ) Notice: Subject to any disclaimer, the term of this patent is extended or adjusted under 35 U.S.C. 154(b) by 260 days.

(21) Appl. No.: 17/713,768

(22) Filed: Apr. 5, 2022

(65) Prior Publication Data
US 2023/0030755 A1 Feb. 2, 2023

Related U.S. Application Data

(60) Provisional application No. 63/226,603, filed on Jul. 28, 2021.

(51) Int. Cl.
*G01N 30/86* (2006.01)
*G01N 30/72* (2006.01)

(52) U.S. Cl.
CPC ......... *G01N 30/8631* (2013.01); *G01N 30/72* (2013.01); *G01N 30/8682* (2013.01)

(58) Field of Classification Search
CPC ............... G01N 30/8631; G01N 30/72; G01N 30/8682; G01N 30/8679
See application file for complete search history.

(56) References Cited

U.S. PATENT DOCUMENTS

| | | |
|---|---|---|
| 10,152,519 B2 | 12/2018 | Nedwed et al. |
| 2005/0112590 A1 | 5/2005 | Boom et al. |
| 2007/0061091 A1 | 3/2007 | Schweitzer et al. |
| 2009/0210194 A1 | 8/2009 | Ritter et al. |

(Continued)

FOREIGN PATENT DOCUMENTS

WO 2021205988 A1 10/2021

OTHER PUBLICATIONS

International Search Report and Written Opinion dated Aug. 2, 2022 in connection with International Patent Application No. PCT/US2022/023485, 11 pages.

(Continued)

*Primary Examiner* — Mohammad K Islam
(74) *Attorney, Agent, or Firm* — Dorsey & Whitney LLP

(57) ABSTRACT

A method for analyzing spectra comprises identifying a set of sample peaks in a sample spectrum, where the sample peaks are associated with fragments of a sample, each having a sample fragment mass. A reference spectrum is selected with one or more reference peaks corresponding to fragments of a reference, each having a reference fragment mass. A mass difference can be determined between selected sample and reference peaks, and a group exchange can be selected based on the mass difference; e.g., where the group exchange represents a change in the sample or reference fragment masses associated with the selected peaks. The selected peaks can be shifted by the mass difference, and a fit value can be determined with respect to the reference spectrum. The fit value characterizes similarity between the respective sets of sample and reference peaks, responsive to the group exchange and corresponding peak shift.

20 Claims, 9 Drawing Sheets

(56) References Cited

U.S. PATENT DOCUMENTS

| | | | |
|---|---|---|---|
| 2013/0065272 A1* | 3/2013 | Chin | C07K 1/064 |
| | | | 435/68.1 |
| 2013/0096883 A1 | 4/2013 | Bradley et al. | |
| 2013/0337456 A1* | 12/2013 | Honisch | C12Q 1/6872 |
| | | | 435/6.12 |
| 2014/0114586 A1 | 4/2014 | Pfaff | |
| 2014/0350392 A1 | 11/2014 | Lundqvist et al. | |
| 2015/0042328 A1* | 2/2015 | Huber | G01N 24/08 |
| | | | 324/308 |
| 2015/0340216 A1 | 11/2015 | Kwiecien et al. | |
| 2016/0259792 A1 | 9/2016 | Nedwed et al. | |
| 2018/0174814 A1 | 6/2018 | Schwieters et al. | |
| 2018/0350575 A1* | 12/2018 | Hock | H01J 49/004 |
| 2019/0096645 A1* | 3/2019 | Richardson | H01J 49/26 |
| 2019/0189414 A1* | 6/2019 | Ikegami | H01J 49/027 |
| 2019/0267222 A1* | 8/2019 | Izumi | G16B 40/10 |
| 2020/0278330 A1 | 9/2020 | Huang et al. | |
| 2021/0098241 A1 | 4/2021 | Kuehl et al. | |
| 2021/0287897 A1* | 9/2021 | Lange | H01J 49/0009 |

OTHER PUBLICATIONS

"Spectrophotometric Analysis: Advanced ATR Correction to Convert ATR Spectra to Transmission Spectra," Shimadzu Corporation, Application News No. A476, Feb. 2014.

Griffiths, Jennifer, "A Brief History of Mass Spectrometry," Analytical Chemistry, 2008, 80, 5678-5683.

Hargreaves, Cameron J. et al. "The Earth Mover's Distance as a Metric for the Space of Inorganic Compositions," University of Liverpool, 36 pages.

Nunn, Simon et al. "Advanced ATR Correction Algorithm," Thermo Scientific, 2008, 4 pages.

* cited by examiner

ADAPTIVE SEARCH MASS SPECTROMETER SPECTRAL ANALYSIS

CROSS-REFERENCE TO RELATED APPLICATIONS

This application claims priority to U.S. Provisional Patent Application No. 63/226,603, filed Jul. 28, 2021, entitled "ADAPTIVE SEARCH MASS SPECTROMETER SPECTRAL ANALYSIS," which is incorporated by reference herein, in the entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This application relates to mass spectroscopy and associated spectral analysis, and more generally to spectroscopic data analysis for sample matching and identifying unknown substances. Applications include, but are not limited to, spectral analysis for mass spectroscopy systems including gas chromatography-mass spectrometry (GC-MS) and liquid chromatography-mass spectrometry (LC-MS) systems, and other or more generalized spectral data analysis.

BACKGROUND

Spectral analysis is a powerful tool for sample matching and substance identification, including the identification of the chemical composition of unknown substances in a particular sample. In gas chromatography-mass spectrometry (GC-MS) systems, a gas chromatograph utilizes a capillary column to separate molecules or fragments (components) of molecules based on physical and chemical properties such as size, weight, length, diameter, film thickness, and other phase characteristics. Differences in these properties determine the relative affinity of different molecules for a stationary phase within the column, as opposed to the mobile phase, promoting separation based on retention time, as the sample travels the column length.

The goal is similar in liquid chromatography-mass spectrometry (LC-MS) systems, in which different molecular fragments or components of a liquid mixture are distributed between stationary and mobile phases, and then separated along the column length, or based on retention time in the column. In practice, there may be additional technical challenges based on the liquid composition of the sample, for which different techniques have been developed. These include adsorption chromatography, partition chromatography, ion-exchange chromatography, size-exclusion chromatography, and affinity chromatography, or reverse-phase (partition) chromatography utilizing a nonpolar (e.g., hydrophobic) stationary phase and a polar mobile phase (e.g., a mixture of water and other polar solvents).

Different molecules elute from the GC or LC stage at different times based on the retention time, which in turn depends on their different molecular (chemical and physical) properties. A downstream mass spectrometer (MS) system captures the molecules or fragments thereof from the upstream GC or LC system, and subjects them to an electron beam, with energy and intensity selected to ionize the different molecules, or (more commonly) break them into ionized fragments. The ionized fragments are electromagnetically accelerated and then subjected to a powerful magnetic field in a mass analyzer, bending the travel path of the molecules (if any) and fragments along different pathways, based on their different mass-to-charge ratios.

The magnetic field separates the travelling ionized fragments by mass, producing a spectrum characteristic of the sample to be identified at a detector. The detector identifies the separated fragments by mass, and provides data for calculating the relative quantity or abundance of each. Generally, different molecules tend to fragment into different components, allowing different spectra to be matched to identify unknown molecules or fragments thereof, in the unknown sample. For many substances, however, there may be many, many different organic and/or inorganic fragments, each of which may have multiple common configurations and variations, of the same or different masses. Identifying the original molecular composition of an unknown sample (or significant fragments of the sample) can thus pose substantial technical challenges, based on the many possible variations that may be observed in the spectrum.

One approach to this problem involves performing spectroscopy on a range of "known" substances, in order to produce a library of reference spectral data. In each reference spectrum, the distribution of mass peaks represents the relative measured quantity of the different fragments, which spectroscopy may derive from the reference molecule. The spectral data obtained from the unknown sample can then be compared to the library of reference spectra, in order to find a match based on similarities in the mass peaks. A number of such libraries of reference spectral data are available for use in the comparisons; e.g., from Wiley Science Solutions (John Wiley & Sons, Inc., Hoboken, New Jersey), and other sources.

Unfortunately, there may be a wide range of different reference spectra from which to choose a suitable "match," particularly for molecules that fragment into multiple organic or inorganic components, which may or may not have similar masses. Different fragments may also have similar masses, independent of their chemical composition. There may also be baseline shifts and other systematic effects, and when the sample and reference spectra are not obtained on identical instruments, they may exhibit systematic variations in the mass peak distribution. Thus, a single mass spectroscopy spectrum may not provide a definitive identification of the sample molecule (or molecules) subjected to spectroscopic analysis, and all the associated fragments. As a result, improved mass spectroscopy analysis techniques are desired, which are not subject to all the same limitations as the prior art.

SUMMARY

A method of adaptive search for use in mass spectrometer analysis comprises identifying on otherwise ascertaining a set of sample peaks in a sample spectrum, where the sample peaks are associated with molecular fragments (or components) of a sample, and selecting a reference spectrum having a set of reference peaks associated with the molecular fragments of a reference. Each of the molecular fragments of the sample has a sample fragment mass, and each of the molecular fragments of the reference has a reference fragment mass. A comparison of the sample spectrum to the reference spectrum can be used to provide a basis for computing one or more fit values or similarity metrics to help identify the sample with the reference. A visual comparison may also be useful, as well as the computed similarity metrics. A list of similar computation results or fit values can be provided for a number of available references in a library or database of reference spectra, for example by ranking the results according to the similarity metric, or otherwise identifying reference spectra with relatively higher similarity metrics (e.g., similarity scores).

Depending on application, the method can also include determining a mass difference between a set of selected sample peaks in the sample spectrum, as compared to a selected reference peak in the reference spectrum, and selecting a group exchange based on the mass difference. The group exchange represents a change in a sample fragment mass associated with one or more of the set of selected sample peaks, as compared with the reference fragment mass associated with fragments in the set of selected reference peaks. Multiple exchanges can also be performed. These candidate group exchanges enable adjustments to and adaptations of the ranked "hit list" (that is, a ranked listing) of candidate reference spectra, based on the respective similarity metrics.

One or more peaks in the reference spectrum can be shifted by the mass difference associated with a candidate group exchange, which is determined to be likely or possible in the unknown sample, as compared to the reference molecule. An updated or adjusted fit value can be determined by recalculating the similarity metric for the sample spectrum, with respect to the shifted reference spectrum, where the fit value characterizes similarity between the respective sets of sample and shifted reference peaks, responsive to the group exchange.

Computer-based systems are also encompassed, including memory and processor components configured for executing these methods and for displaying sample spectra and original and shifted reference spectra on a user interface, along with the respective fit values and associated data. Computer products with machine-readable code stored on a non-transitory medium are also included, where the code is executable by a computer processor to perform the methods, or to operate the systems.

In any of these examples, the sample spectrum can be obtained from a mass spectrometer system, for example a gas chromatography-mass spectrometry (GC-MS) system or a liquid chromatography-mass spectrometry (LC-MS) system. The reference spectra may be obtained from a similar system, and stored in a library or database. One or both of the sample spectrum and the reference spectrum can be output to a user interface (UI), e.g., a graphical user interface (GUI), along with one or more suggested (system-identified) or user-selected group exchanges, and system-calculated fit values. Input can also be received at the user interface, where the input may determine the selected group exchange. A set of suggested group exchanges can also be output to the user interface; e.g., where the input is used to determine a selected group exchange from among the set of suggested group exchanges.

In any of these examples, a total mass value representing the molecular ion mass of a sample may be provided at a user interface; e.g., where the total mass value is based on the sample peaks in the sample spectrum provided as a search input. The total mass value can be used to select a reference spectrum, to determine the mass difference, or to select the group exchange. A user may also provide input at the user interface, for example to update or change the total mass value. In some of these applications, a null or zero total mass value and other parameters may be output to, displayed on, or otherwise provided at the user interface, and input received at the user interface can be used to determine the total mass value.

In any of these examples, the group exchange can represent the exchange of a group of atoms in the molecular fragment associated with the selected sample peak, with a different group of atoms in the molecular fragment associated with the selected reference peak. The group exchange can also represent the exchange of an entire molecular fragment associated with a selected sample peak, with an entire molecular fragment associated with a selected reference peak.

In any of these examples, one or more additional group exchanges can be selected, representing one or more additional mass differences between the sample fragment masses associated with the sample peaks, and the reference fragment masses associated with the reference peaks. One or more additional sample peaks or reference peaks can be shifted by the respective one or more additional mass differences, for example where the fit value characterizes similarity between the respective sample and reference spectra, including the additional shifted sample or reference peaks, responsive to the one or more additional group exchanges.

In any of these examples and embodiments, the sample and reference spectra can be obtained from a more generalized molecular or atomic spectral data analysis system, for example a visible or ultraviolet (UV) spectroscopy system, an infrared (IR) spectroscopy system, a Raman spectroscopy system, or a nuclear magnetic resonance (NMR) spectroscopy system. In these applications, the sample fragment mass and reference fragment mass can be associated with the sample and reference fragments, for example the mass of light-emitting fragments for IR, visible or UV spectroscopy, the mass of molecular fragments with vibrational or rotational states responsive to Raman spectroscopy, or the mass of other nuclear or molecular fragments having different nuclear spin response for NMR spectroscopy.

DETAILED DESCRIPTION

Figure 1:
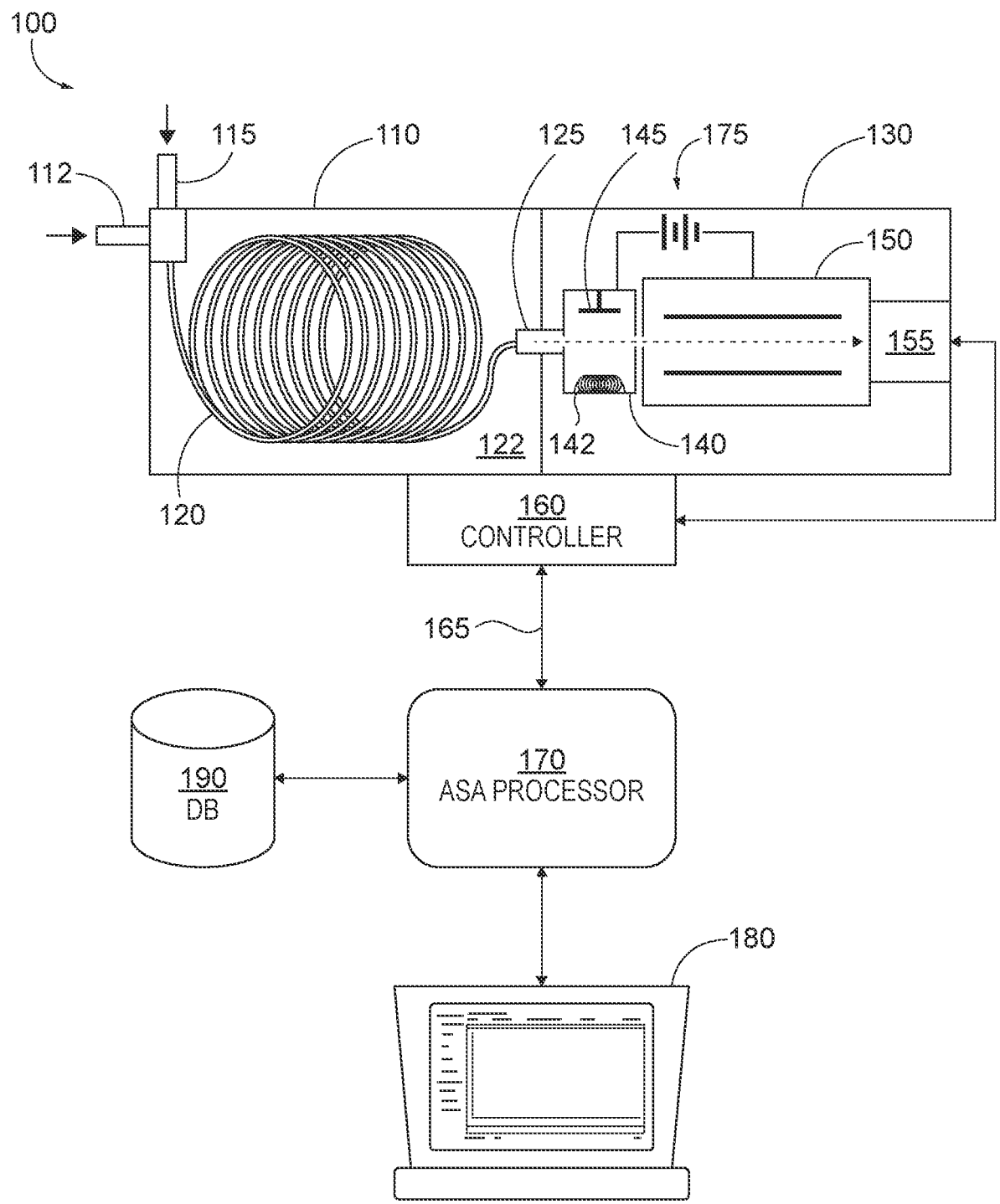
FIG. 1 is a schematic illustration of a mass spectroscopy system, with an adaptive search analysis processor.

This disclosure relates to spectral analysis for mass spectrometry, and more generally to adaptive search techniques for spectral analysis, as described herein. Depending on application, these techniques enable analysis of a sample spectrum (or "molecular fingerprint") of a general unknown sample or substance, in order to determine the sample's exact mass, finding, identifying or selecting reference spectra that are within a mass threshold of the sample mass, and then shifting selected isotopic patterns to determine what potential structural fragment substitutions (group exchanges) or additions would be required to generate the sample spectrum, based on the reference spectrum (or vice-versa).

Introduction

In this adaptive search technique, only certain fragment patterns may be shifted. The search identifies similar compounds, where a fragment group can be present or missing in the reference spectrum, as compared to the sample or unknown spectrum. For example, the presence or absence of a given molecular fragment in the reference spectrum can cause some reference peak positions to differ from that of the unknown sample by a mass difference or delta mass ($\Delta M$). The masses and mass differences are typically defined in atomic mass units (AMU), but the choice of scale is arbitrary, and it is also common in mass spectroscopy to use either u (AMU) or m/z (mass per unit charge), understanding that the charge is typically one. Multiply ionized fragments will have a smaller bending radius, and can be captured on that basis, and noise-suppression algorithms can also be utilized, as known in the art.

The adaptive analysis can be used to shift one or more reference peaks by the mass difference $\Delta M$, in order to achieve a better (improved) matching score or fit value (calculated similarity metric). Based on the better matching score or fit values, similar compounds may be presented to a user interface in a hit list (e.g., a ranked listing of a subset of potential matches). To indicate the shifts performed by the adaptive search, dotted lines or other indicia may be used on the display of the user interface, in order to show the reference spectrum before and after shifting, for example on the window of a graphical user interface.

This enables the user to "map" the reference spectrum onto the sample, or vice-versa, and identify the best (or better) fit. When the user provides input (e.g., by entering a total mass value, a mass difference, or simply by clicking on a particular button or link associated with a "hit"), this may be used to help select a reference spectrum or group exchange, or to indicate a potential match with relatively high fit value. The technique is adaptable to both gas chromatography (GC) and liquid chromatography (LC) mass spectrum (GC-MS or LC-MS) analysis, and other forms of spectral analysis, with mass peaks or other spectral features suitable for a similar adaptive search algorithm based on differences in composition between the reference and sample spectra.

Mass Spectroscopy System Overview

FIG. 1 is a schematic illustration of a mass spectroscopy system (or mass spectrometer) 100, in data communication with an adaptive search analysis (ASA) processor 170. In the gas chromatography-mass spectrometry (GC-MS) configuration of FIG. 1, spectroscopy system 100 includes a gas chromatograph or chromatography (GC) system 110 and a mass spectrometer or spectroscopy (MS) system 130. Alternatively, spectroscopy system 100 can utilize a liquid chromatography-mass spectrometry (LC-MS) configuration, with a liquid chromatograph or chromatography (LC) system 110 coupled to the mass spectrometer 130, or another spectral analysis system 100 can be used for initial separation of the sample molecules.

As shown in FIG. 1, gas chromatograph 110 includes a carrier gas inlet 112 adapted for accepting a stream of carrier gas (e.g., hydrogen, helium, nitrogen, argon, or other carrier gas suitable for application as a mobile phase), and a sample port 115 configured for introducing an unknown substance or sample into the carrier gas stream. The carrier gas and sample propagate through a column 120 (e.g., an open tubular or capillary column, or a packed column with a solid, inert support material), which can be coated with a thin film of liquid defining the stationary phase.

Different molecular constituents of the sample are separated based on retention time in the column 120, which in turn depends on their relative affinity for the mobile and stationary phases. The affinity depends on the temperature, which is regulated by placing the column 120 in an oven or similar temperature-controlled enclosure 122.

The separated sample constituents exit the column 120 via a transfer line 125, which transports them to the mass spectrometer system 130. Mass spectrometer system 130 includes an ionization chamber 140 with a filament 142 and electron trap 145. Ionization chamber 140 is configured for electrons that exit the filament 142 with sufficient energy to ionize the sample constituents and separate them into fragments, with excess electrons caught in the trap 145.

Typically, the electron energy can be controlled to exceed the ionization potential, providing additional energy to break the sample constituents apart into ionized molecular fragments. A DC potential 175 is applied to accelerate the ionized fragments travelling into and through the mass analyzer 150, where a powerful magnetic field is applied to bend the fragments along different pathways, based on their different mass-to-charge ratios. The fragments are spatially separated along the different paths, and counted by a detector 155 connected with a local processor or controller 160 adapted for data processing and control of spectroscopy system 100.

Counting the fragments accumulated along different pathways provides evidence of the relative abundance of each mass-separated fragment in the sample molecule, as accumulated (integrated) over a given time window. Alternatively, real-time data accumulation and analysis can be applied. The highest peak values observed in the spectrum are typically a focus for the adaptive search, but lower values corresponding to less abundant fragments may also be representative components of the sample molecule, and subject to the same or similar analysis.

In operation, spectroscopy system 100 obtains a sample spectrum from the unknown substance, including a set of sample peaks associated with the abundances of different fragments of the sample, each having a characteristic sample fragment mass. Local spectrometer controller 160 is in data communication with an adaptive search analysis (ASA) processor 170, for example via a wired or wireless network communication link 165. Link 165 can also be adapted for either real-time or asynchronous communications between spectroscopy controller 160 and ASA processor 170.

ASA processor 170 is provided in communication with a user interface 180, and has access to a reference spectrum library or database (DB) 190. Suitable databases 190 include, but are not limited to, mass spectral (MS) databases, gas chromatography-mass-spectrometry (GC-MS) spectral databases, and liquid chromatography-mass spectrometry (LC-MS) spectral databases. Suitable examples include, for example, the WILEY REGISTRY and other important collections for mass spectrometry, the KNOWITALL mass spectral database collection, National Institute of Standards and Technology (NIST) and National Institutes of Health (NIH) mass spectral libraries, libraries of biologically and environmentally important organic compounds (ISIDOROV), mass spectra of designer drugs, geochemicals, petrochemicals and biomarkers (SPECDATA), mass spectra of drugs, poisons, pesticides, pollutants, and their metabolites, LIPIDS mass spectral data, mass spectral libraries for pesticides, e.g., with linear retention index (LRI), mass spectra of flavors and fragrances of natural and synthetic compounds, fatty acid methyl ester (FAMES) mass spectral libraries, mass spectra of physiologically active substances, and mass spectra of volatiles in food (SPECDATA). In other application the techniques described here may also be applied to infrared (IR) spectral data (e.g., IR, Fourier transform IR (FT-IR), attenuated total reflection (ATR) IR spectroscopy, and other IR spectra libraries including Sadtler and Hummel spectra; nuclear magnetic resonance (NMR) spectral databases, including hydrogen or proton (HNMR) and carbon (CNMR) spectra, as wells as NMR spectra for other nuclei; Raman spectral databases (e.g., WILEY high-quality Raman spectra featuring Sadtler data), and ultraviolet-visible (UV-Vis) spectral databases. These and other suitable spectral databases are available, e.g., from Wiley Science Solutions, as described above, and other sources.

ASA processor 170 can be configured to ascertain the set of sample peaks in a sample spectrum obtained by spectroscopy system 100, where each sample peak is associated with a sample molecule or fragment thereof, having a characteristic sample molecule or fragment mass. ASA processor 170 can then select one or more reference spectra from the database 190, for comparison with the sample spectrum. User interface 180 may describe any or all particular examples of a user interface 180A-180H or 180J, as described herein. Similarly, any example of a user interface 180A-180H or 180J can be embodied by user interface 180.

Each sample spectrum captured and selected for analysis includes a set of reference peaks associated with fragments of a particular reference material. Each reference fragment has its own characteristic reference fragment mass, typically measured either in atomic mass units (AMU or u), or in mass per unit charge (m/z). Generally, the sample and reference spectra selected for analysis should be obtained with substantially similar spectroscopy systems, for example a GC-MS or LC-MS spectroscopy system 100, according to FIG. 1. Given that a broad range of commercially available (and custom-designed) GC-MS and LC-MS systems are available, however, even under favorable conditions ASA processor 170 can also be adaptable to account for systematic differences between the sample and reference spectra, for example by modulating the peaks in the spectra to account for mass-based differences in sensitivity, or for systematic shifts in mass.

As an improvement over existing technologies, ASA processor 170 is also configured to accommodate and account for differences in chemical composition between the sample and reference spectra, based on an adaptable group exchange analysis. To accomplish this, ASA processor 170 determines mass differences between selected sample and reference peaks, using group exchanges to adjust for the mass differences, as described herein, and to improve the fit between the sample and reference spectra, based on the group exchanges.

The mass spectroscopy system 100, ASA processor 170, user interface 180 and database 190 of FIG. 1 are merely representative. In other examples, different spectral processing systems 100 can be used, such as optical, ultraviolet, infrared, Raman, or nuclear magnetic resonance spectroscopy system 100. In these examples, database 190 can provide access to reference spectra from multiple types of systems, so that reference data of a similar type can be located for use in the analysis, and the output to user interface 180 is adapted accordingly.

Analysis Using Mass Differences at Peaks

Figure 2:
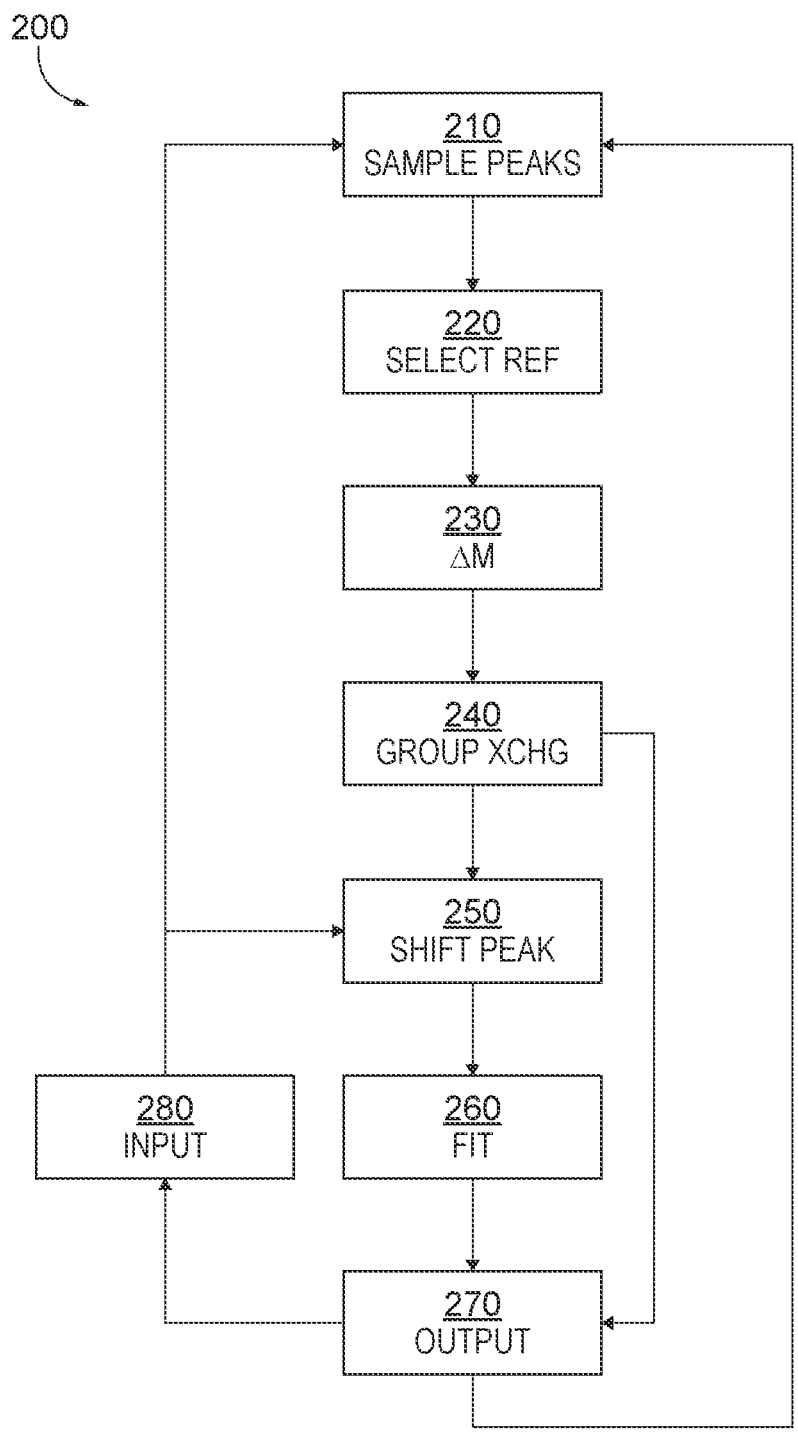
FIG. 2 is a block diagram of a method for adaptive search mass spectrometer spectral analysis.

FIG. 2 is a block diagram of a method 200 for adaptive mass spectrometer analysis, for example as performed by an ASA processor 170 as shown in FIG. 1. In this particular example, method 200 includes one or more process steps selected from: identifying or ascertaining a set of sample peaks in a sample spectrum (step 210), selecting a reference (REF) spectrum (step 220), determining a mass difference ($\Delta M$) between selected sample and reference peaks (step 230), selecting at least one group exchange (XCHG) to account for the mass difference (step 240), shifting the selected peaks (step 250) according to the mass difference, and determining a fit value (step 260) for the sample and reference spectra, including the shifted peaks, so that the fit value is responsive to the group exchange.

The fit value can then be output (step 270) to a graphical user interface configured for user access. Method 200 can also be performed iteratively, for example in order to test different group exchanges until an improved fit value is obtained, for example a higher value than in a previous iteration, or a fit value over a threshold, or within a predetermined suitable range. Alternatively, the steps of method 200 can be performed in any order or combination, with or without additional process steps, described herein.

Ascertaining a set of sample peaks in the sample spectrum (step 210) encompasses identifying the set of peaks and associating the reference peaks with the molecular fragments of the sample material (e.g., an unknown substance). Each of the sample peaks is associated with a sample fragment mass, and with a peak height or magnitude associated with the relative contribution or abundance of that fragment within the fragmented sample molecules passing through the mass spectrometer, in a selected sampling period.

Selecting a reference spectrum (step 220) can be performed via data communication with a database of such spectra; e.g., a library or database 190 according to FIG. 1. Each sample spectrum includes a set of reference peaks associated with the fragments of a particular (known) reference material. Each reference fragment has its own characteristic (known) reference fragment mass, and a peak magnitude or height, representing the relative abundance of that fragment in the fragmented reference molecules used to obtain the reference spectrum.

Typically, the reference and sample peaks will not all match, either in fragment mass (representing the total atomic or molecular weight of the fragment), or in relative height (representing the fractional composition of the sample or reference material). In this adaptive method for mass spectrometer spectral analysis, mass differences can be determined (step 230) between one or more selected sample peaks in the sample spectrum, as compared to one or more selected reference peaks in a selected reference spectrum.

The mass differences are analyzed to identify and select one or more group exchanges (step 240). For example, the group exchange can represent a change in the chemical makeup of a sample fragment associated with a selected sample peak, which would yield the observed mass difference, as compared with the reference component associated with a selected reference peak.

In some examples, the group exchange represents the exchange of a group of atoms in the molecular fragment associated with the selected sample peak, with a different group of atoms in the molecular fragment associated with the selected reference peak. Alternatively, the group exchange may represent the elimination of a group, or the exchange of the entire molecular fragment associated with the selected sample peak with the molecular fragment associated with the selected reference peak.

Shifting the selected peak (step 250) can be accomplished either by shifting the selected sample peak by the mass difference associated with the selected group exchange, of by shifting the selected reference peak by the mass difference. The shift will either be positive or negative along the mass scale of the spectrum, depending on whether the selected group exchange would increase or decrease the respective fragment mass.

Determining a fit value (step 260) may performed for the sample spectrum with respect to any selected reference spectrum, including one with the shifted sample or reference peak, so that the fit value is responsive to the group exchange. The fit value can be defined to characterize similarity between the respective sample and reference spectra according to a statistical measure or other metric, for example a convolution of the respective spectral functions, or a dot product of vectors representing the peaks in each of the sample and reference spectra. Alternatively, a likelihood function can be used, or an alternative measure of similarity. Other examples of similarity metrics are described, e.g., in K. X. Wan et al., "Comparing similar spectra: from similarity index to spectral contrast angle," J. Am. Soc. for Mass Spec., Vol. 13, No. 1, 85-88 (2002), and C. J. Hargreaves et al., "The Earth Mover's Distance as a Metric for the Space of Inorganic Compositions," Chem. Mater. 2020, 32, 24 10610-10620 (American Chemical Society, Dec. 2, 2020), which is incorporated by reference herein.

One or both of the sample and reference spectra can be output to a graphical user interface (step 270), for example an interface 180 that can display a screen as shown in FIG. 1. Depending on application, the fit value and method of computation or selected group exchange (or both) can also be output to the interface. Input can also be received (step 280) from the user interface, for example where the input determines the selected group exchange. In particular examples, a set of proposed or suggested group exchanges can be output to the user interface, based on the identified mass differences. In these applications, the input may determine the selected group exchange from among the set of suggested group exchanges, for example based on user preference or user selection. Thus, the user may make a selection based on the availability of other analytic data developed to test a hypothesis about the structure and composition of the unknown molecule being analyzed, based on the sample spectra and other analysis results presented at the user interface.

In some examples, one or more additional peaks in the sample or reference spectrum can be shifted (step 250) by the mass difference (step 250), representing additional group exchanges (step 240). In these examples, the fit value (step 260) can characterize similarity between the respective sample and reference spectra, including the additional shifted sample or reference peaks, responsive to the additional instances of the group exchange.

In some examples, one or more additional group exchanges can be selected (step 240) representing one or more additional mass differences (step 230) determined between the sample component masses associated with the sample peaks, as compared with the reference component masses associated with the reference peaks. In these examples, one or more additional peaks in the sample or reference spectra can be shifted by the additional mass differences, so that the fit value characterizes similarity between the respective sample and reference spectra, responsive to the additional group exchanges.

In some applications, the sample and reference spectra are obtained from a mass spectrometry system, for example a GC-MS or LC-MS system 100 and database 190 as described above. In these examples, the sample peaks are typically associated with molecular fragments of the sample, and the reference peaks are associated with molecular fragments of the reference. In other examples, the sample and reference spectra can be obtained from optical, ultraviolet, infrared, Raman, or nuclear magnetic resonance spectroscopy systems, and both the spectral content and the other output to the user interface can be adapted accordingly.

Analysis System Overview

Figure 3:
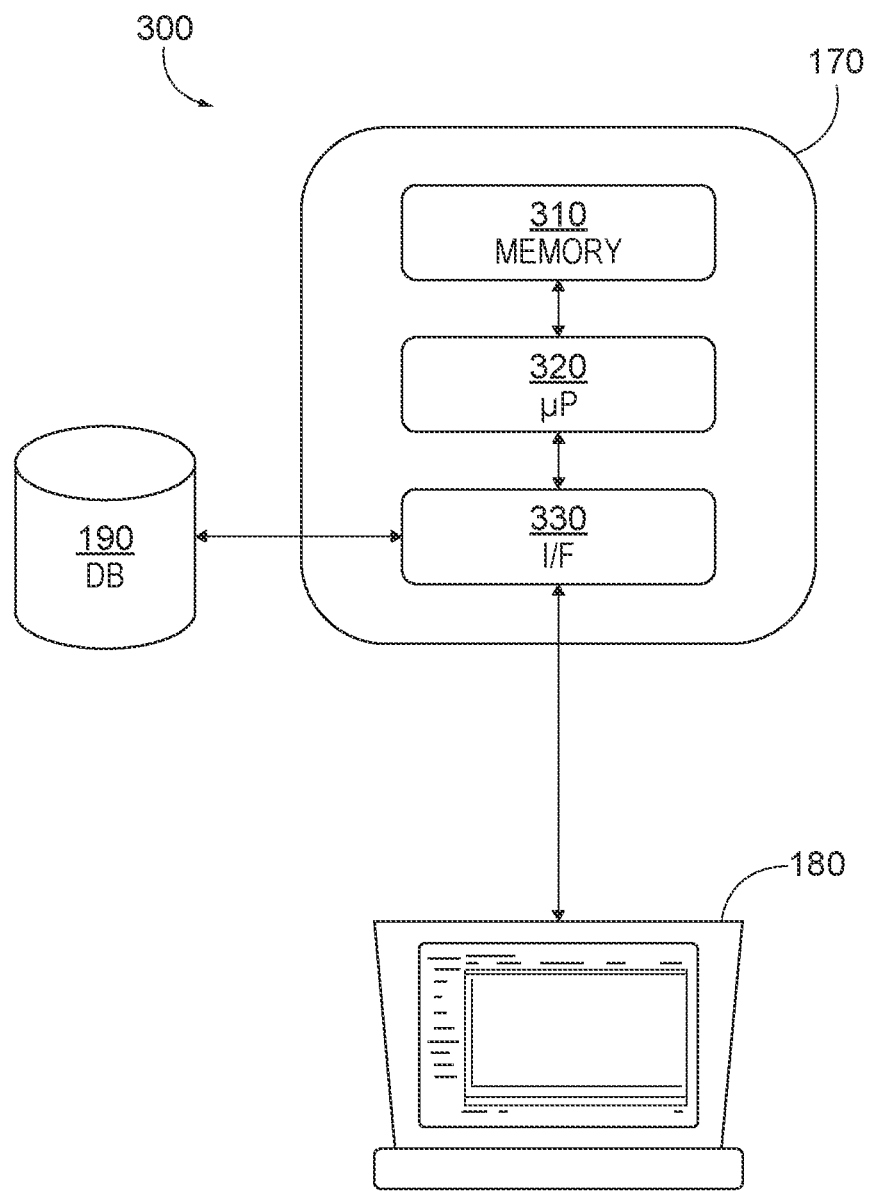
FIG. 3 is a block diagram of an adaptive system for mass spectrometer spectral analysis.

FIG. 3 is a block diagram of an adaptive system 300 for mass spectrometer spectral analysis. As shown in FIG. 3, system 300 includes an adaptive search analysis (ASA) processor 170 in communication with a user interface 180 and a spectral library or database (DB) 190, for example as shown in FIG. 1.

ASA processor 170 includes memory 310, a computer processor or microprocessor (μP) 320, and an interface 330 for data communications with user interface 180 and spectral database 190. Memory 310 includes a non-transitory, machine-readable data storage medium configured to store computer code that is executable on the processor 320 in order to perform adaptive search analysis, for example according to system 100 of FIG. 1, or according to method 200 of FIG. 3.

Figure 4A:
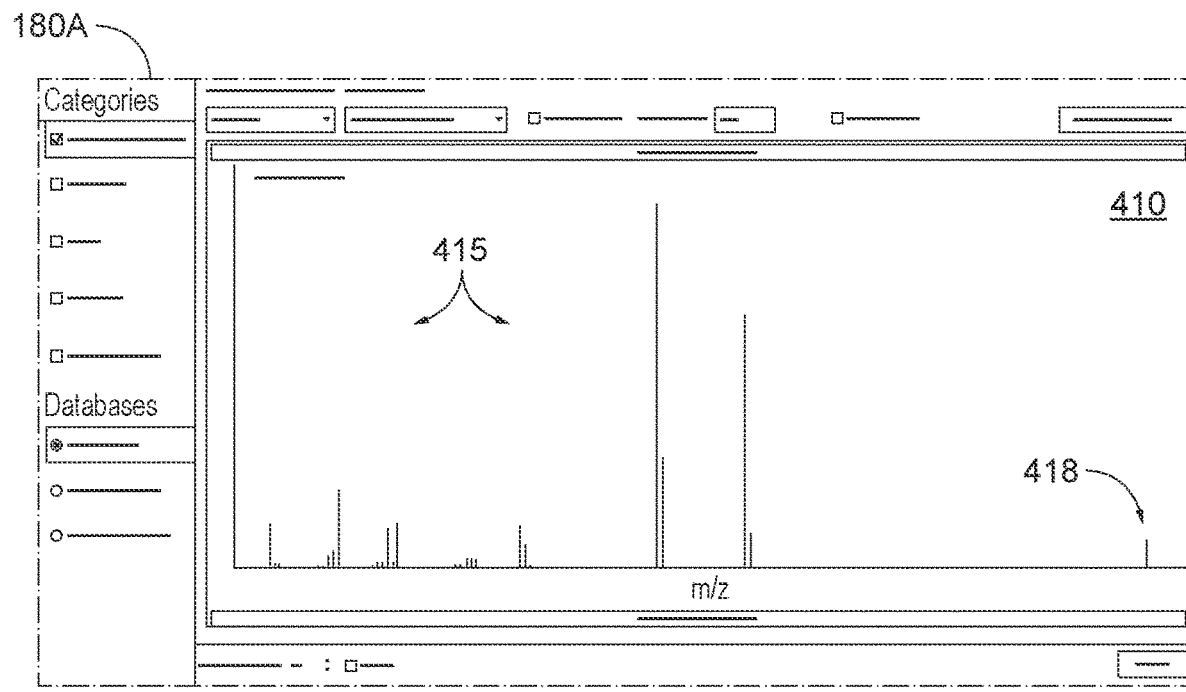
FIG. 4A is an illustration of a user interface showing a representative spectrum suitable for adaptive search analysis.

FIG. 4A is an illustration of a user interface 180A, showing a representative spectrum 410 suitable for adaptive spectral analysis, as described herein. In this particular example, the exact mass of the unknown sample appears in a spectrum of peaks 415; e.g., as indicated by the highest-mass peak 418, representing the unfragmented, unknown or sample molecule, with total mass value 220 mass units (AMU or u). This value is then used in the adaptive search, in order to select a reference spectrum for comparison.

Figure 4B:
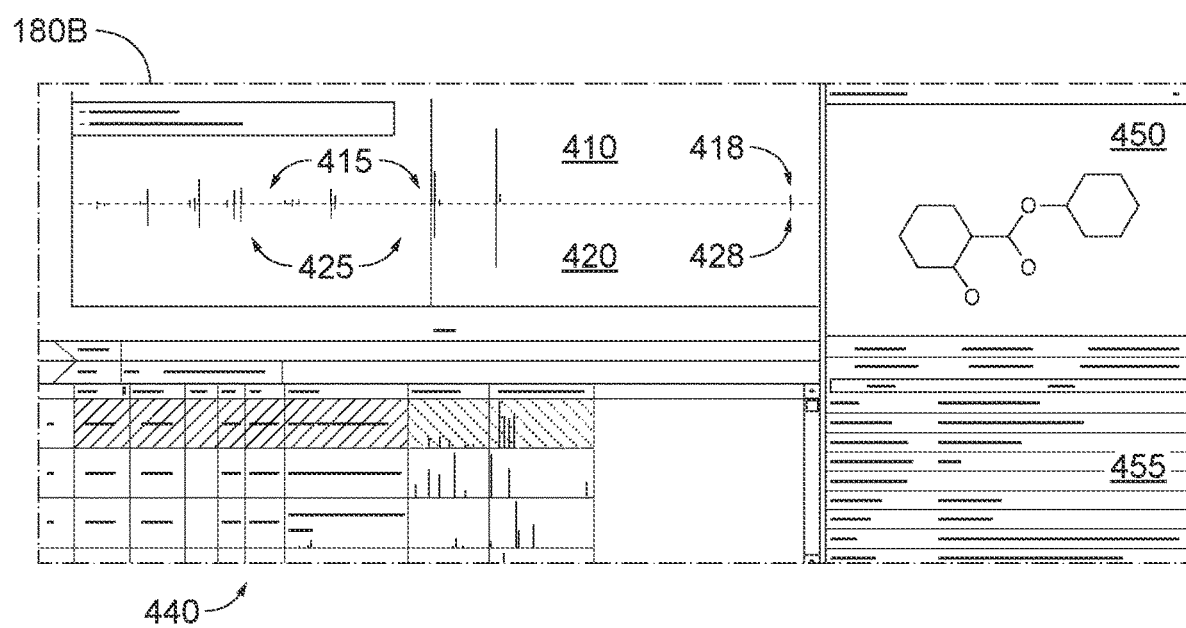
FIG. 4B is an illustration of a user interface showing a match between representative sample and reference spectra.

FIG. 4B is an illustration of a user interface 180B, showing a match (or potential match) between representative sample and reference spectra. FIG. 4B is a "butterfly" view, with the sample spectrum 410 upright and the reference spectrum 420 inverted, along the same baseline or x-axis. A hit list (or similar ranked listing) 440 can be provided for identifying a subset of candidate spectra that are selected based on their (e.g., relatively higher) similarity metrics.

Interface 180B can also display a diagram, image or similar graphic 450 representing the chemical structure of the selected (or candidate) reference molecule, with an additional information panel or window 455 including one or more corresponding data fields such as the chemical name, chemical formula, classification, CAS (American Chemical Society) registry number, and/or other database/library names or identifiers, as well as the estimated, nominal, or exact mass (if known), an estimated or nominal retention index (e.g., the estimated Kovats retention index), and other information describing the reference molecule or candidate match.

For example, a suitable field group F0 could be represented in window 455 as follows Name/CS Reg. No./Class/DB Name/Kovats (est.)/
    Mass/Formula                                            [F0]

Each data field can be provided with an associated name and value. Rather than selecting from among these (or all of these) representative properties, the user could also select data fields from a different (preferred) set of properties, for original data files, attachments, or from selected sets of molecular substructures (e.g. in order to identify a candidate ΔM substitution).

If the sample compound is found in the reference database (e.g., based on the total mass and/or other sample peaks), the first (highest similarity) hit will typically be the compound itself, as shown in FIG. 4B. In this case the sample spectrum 410 and the reference spectrum 420 exhibit the same highest (total mass) peak 418/428, and with similar peaks 415/425 in the rest of the spectrum, matching both for mass values (representing the different fragments, in the sample and reference spectra), and in amplitude (representing the same relative composition).

The quality of the match can also be described by a fit value, which provides a numerical assessment of the match (or similarity) between the sample and reference spectra. For example, a dot product of a normalized vector representing the peaks in each spectrum (sample and reference) can be used to generate a hit quality index (HQI), ranging from a minimum fit value of zero to one with a maximum fit value of one. Alternatively, a convolution of the spectral functions can be used, or a likelihood function, or other mathematical measure of similarity.

The listing 440 displays a subset of candidate spectra that can be can be selected or ranked (or both) based on their respective similarity metrics, or based on user input. The spectra can be associated with particular values in the respective columns, for example with columnar fields for the hit quality index (HQI) or other similarity metric, a user-selected or system-generated tag (TAG), and a database (DB) identifier with identification (ID) number, cataloguing the candidate spectrum within the database. The name of the candidate molecule can also be displayed, in suitable industry-standard form, along with the exact (or known) mass, and a graphical representation of the candidate spectrum itself, for comparison to the sample spectrum; e.g. in a suitable field group F1 as shown here:

HQI/TAG/DB/ID/Name/[Spectrum]                              [F1]

In these field representations, square brackets denote a field that may include graphical data. Once a group replacement is selected, the listing 440 of the selected subset of reference spectra can also include additional fields, for example a residual or adjusted hit quality index (R.HQI) (e.g., recalculated after the selected substitution), the associated ΔM value, and a description of the replacement group (e.g., substitution of chlorine for another atom, or other atomic group exchange, in either graphical or text form, or both). If a particular spectrum contains the target molecular ion mass, the mass can be displayed in an associated field (e.g., a molecular mass or μ/z box), with a solid triangle or other marker to indicate the corresponding position in the (graphical) spectrum field; e.g., in a suitable field group F2:

HQI/TAG/R.HQI/DB/ID/Name/[Spectrum]/ΔM/
    [ΔM]/Replacement                                       [F2]

Figure 5A:
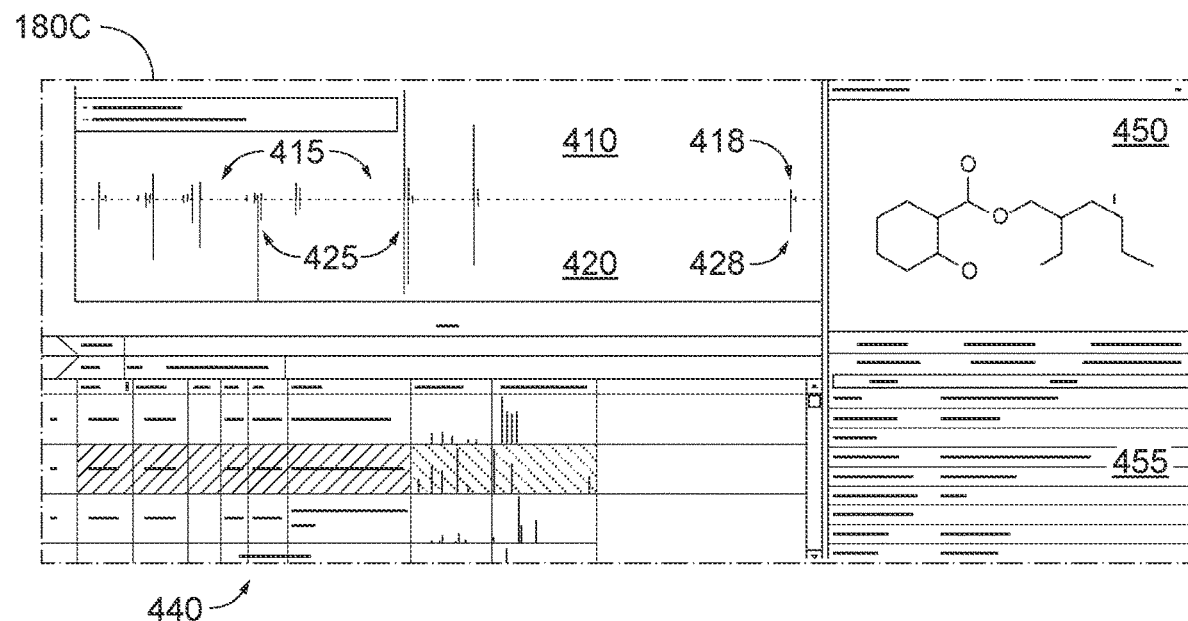
FIG. 5A is an illustration of a user interface showing a mismatch between representative sample and reference spectra.

FIG. 5A is an illustration of a user interface 180C, showing a partial match between representative sample and reference spectra (and conversely, a partial mismatch). If the sample compound is not found in the reference database, the fit value will vary, because the spectra may be less similar. For example, the sample spectrum 410 and reference spectrum 420 may exhibit a similar total mass value at peaks 418 and 428, respectively, but the amplitudes may vary, and the other sample peaks 415 and reference peaks 425 may be less similar, as shown in FIG. 5A.

Depending on the fit value and sample and reference spectra compared and displayed on the user interface, the adaptive search results may or may not be convincing that there is a good match between the (unknown) sample substance, and the (known) reference substance indicated by the graphic 455, for example with total molecular mass and other identifying information in display window 455. In such a case, the user interface can also be configured to accept a total mass value; e.g., as input from the user, in order to select another reference spectrum, or to determine mass differences between selected sample and reference peaks, suitable for a delta-mass/group exchange analysis.

In the situation of a partial match between a representative sample of an unknown substance and one or more reference spectra, the user interface enables the user to perform adaptive searching to find a better match, with improved fit value. This adaptive searching component is configured to find similar compounds where a molecular group can be present, missing or exchanged, as compared to the unknown sample spectrum. The presence, absence or exchange of a group causes some peak positions in the reference spectrum to differ relative to the spectrum of the unknown substance, by a change in mass or "delta mass" (ΔM).

The adaptive searching features enable a user to shift some peaks by the selected ΔM to achieve a better matching score or fit value. Because of these changes, different similar compounds may appear on top of the hit list (ranked subset or listing) 440, identifying the highest similarity scores. To mark the shifts performed by adaptive searching, dotted lines or other indicia are used to show the shift in reference fragment masses in the reference spectrum, before and after the shifting process, in a window of the user interface. These dotted lines or other indicia may also be selectively shown in response to a user clicking or selecting a designated button or icon in the hit list 440, or responsive to similar input, in order to configure the display of search results on the interface. The indicia may include color coding, parallel labeling, tabular presentations or other similar marks, indicators or indicia that identify or indicate the association between shifted and unshifted mass peaks, or other spectral data.

Figure 5B:
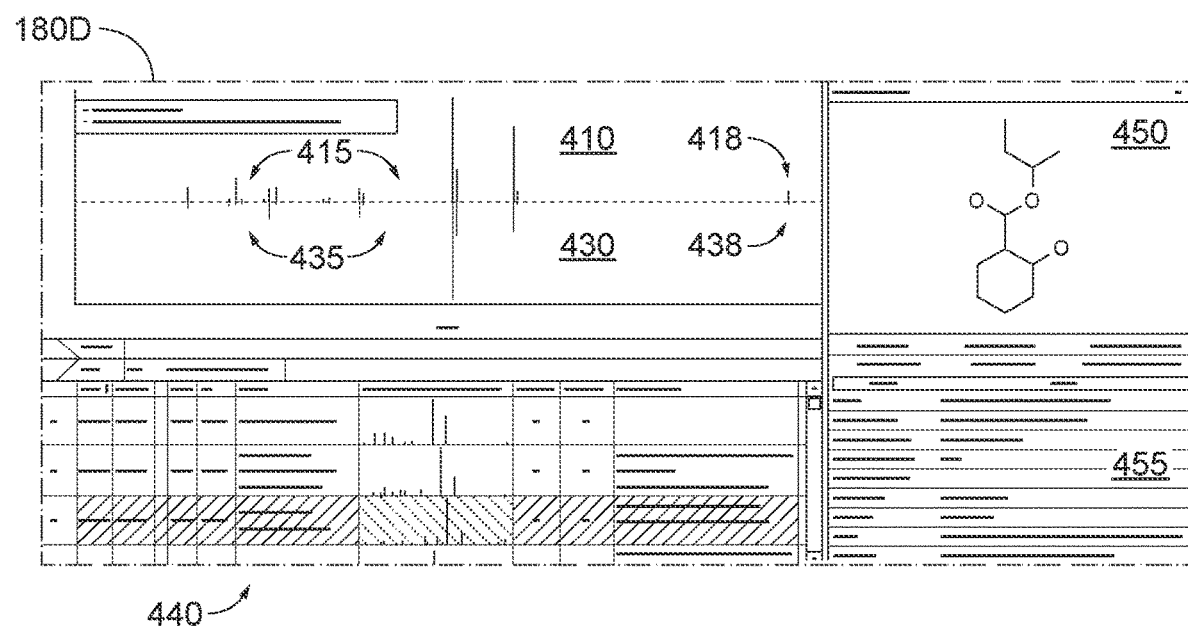
FIG. 5B is an illustration of a user interface showing an improved match between representative sample and shifted reference spectra, based on a delta-mass analysis.

FIG. 5B is an illustration of a user interface 180D, showing an improved match between representative sample spectrum 410 and a shifted reference spectrum 430, based on a delta-mass/group exchange analysis. As shown in FIG. 5B, a mass difference (e.g., ΔM of 26 u, or other displayed value) is determined between selected peaks in the sample and reference spectra, and used to select or suggest a missing group or group exchange, which would correspond to the mass difference. After the exchange (in one particular case, a Cyclohexyl ring replacing a Butyl group), the fit value is substantially increased, reflecting a better match (improved fit) between the sample and shifted reference peaks 415 and 435, respectively, and more similar respective total mass peaks 418, 438.

This is an example of a suitable ΔM exchange, representative of the adaptive search technique. In other examples not only the exchange ΔM but also the resulting match between the sample and shifted reference peaks can also provide an indicator of the match quality, for example in a visual or graphical comparison, independent of the hit quality index (HQI) or other fit value or similarity metric determined by the interface (e.g., as used to generate the ranked listing 440).

See also the additional examples below. Depending on application, suitable output to the user interfaces 180A-180D, 180E or 180F-180H and 180J (below) can include the mass difference between selected peaks (ΔM), information identifying the selected sample and reference peaks, for which the mass difference is determined, and a suggested group exchange or replacement, which would yield a different (e.g., higher fit value), after shifting the selected peak or peaks by the mass difference.

Figure 6:
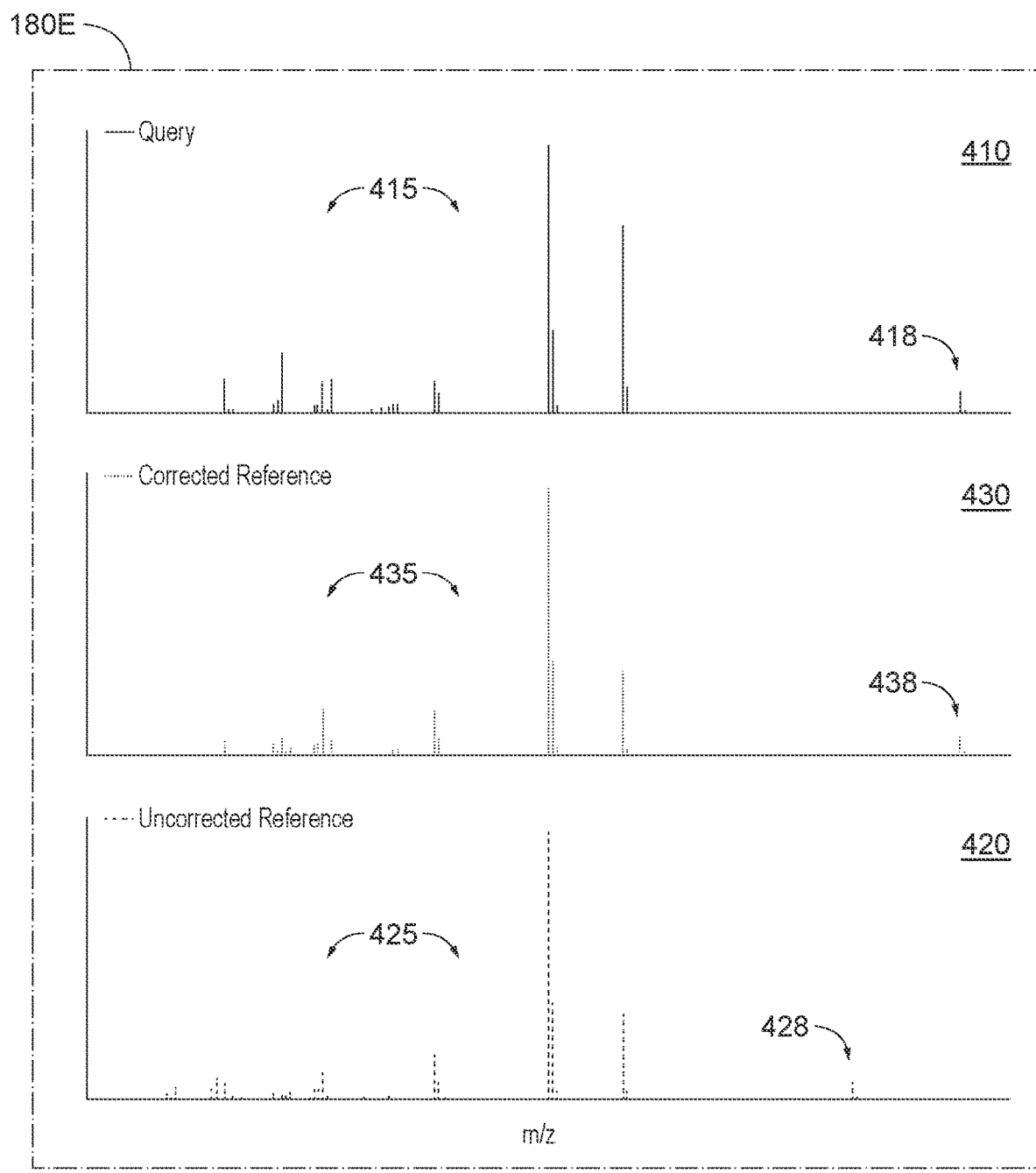
FIG. 6 is an illustration of a user interface showing representative sample, shifted reference, and unshifted reference spectra.

FIG. 6 is an illustration of a user interface 180E showing a representative sample (unknown) spectrum 410, a shifted reference spectrum 430, and an unshifted reference spectrum 420. As shown in FIG. 6, a mass difference is determined between the sample peaks 415 and the unshifted reference peaks 425, for example with ΔM=26 u. This mass difference corresponds to a group exchange representing different molecular fragments of the (unknown) sample and (known) reference. After making the exchange, the reference peaks 425 are shifted to new values 435, providing a better fit to the sample peaks 415. The total mass peak 428 in the reference spectrum is shifted by the same amount, to its new value 438, which also matches the sample total mass peak 418.

As shown in FIG. 6, the reference peaks 425, 428 in reference spectrum 420 are shifted by a mass difference ΔM, in order to produce a shifted reference spectrum 430 with shifted peaks 435, 438, which better match the sample peaks 415, 418, yielding a higher fit value when compared to sample spectrum 410. For reasons of convenience, the reference may typically be shifted to match the sample. Equivalently, the sample peaks 415, 418 in sample spectrum 410 could be shifted to match the (unshifted or uncorrected) peaks 425, 428 in (unshifted) reference spectrum 420, based on the mass difference ΔM, and the same corresponding group exchange. The technique can thus be performed on either basis (shifting ether the sample or reference spectrum), depending on application and user preference.

Figure 7A:
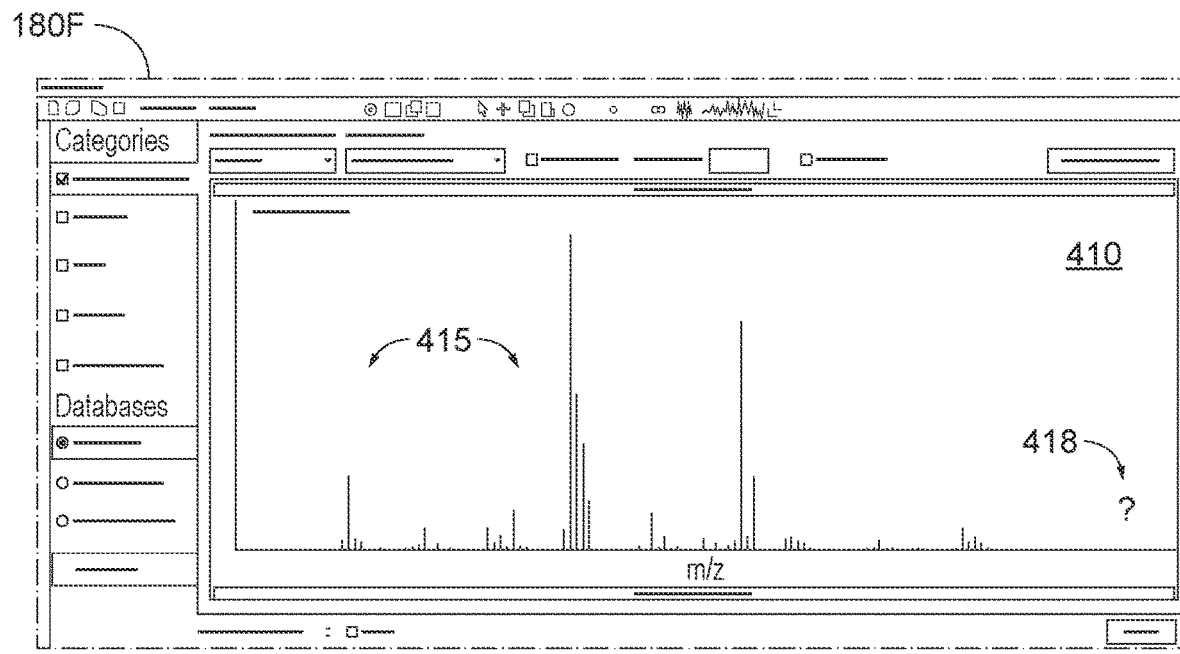
FIG. 7A is an illustration of a user interface showing a representative sample spectrum, with unknown molecular mass.

FIG. 7A is an illustration of a user interface 180F, showing a representative sample spectrum 410 with unknown molecular (total) mass. As shown is FIG. 7A, this sample spectrum 410 does not contain a clear total mass peak, which would indicate the (unknown) molecular ion mass. This may occur, for example, when few or no sample molecules reach the detector without fragmentation. The total mass can nonetheless be estimated from the other peaks 415 in the sample spectrum 410 (e.g., by combining the masses of the different fragments, and looking for a peak in the distribution), and the estimated mass can be used to select a reference spectrum for delta-mass/group exchange analysis.

The estimated mass can also be output to the user interface 180F, or updated via the interface 180F, in the form of user input. If no total mass is determined from the sample spectrum, the system can determine one from the best matching reference spectra, based on an (e.g., iterative) shifting of the peaks in the sample spectrum to propose at least one mass difference ΔM and developing a numerical assessment of the match (or similarity) between the sample and reference spectra, as adjusted by peak shifting.

Figure 7B:
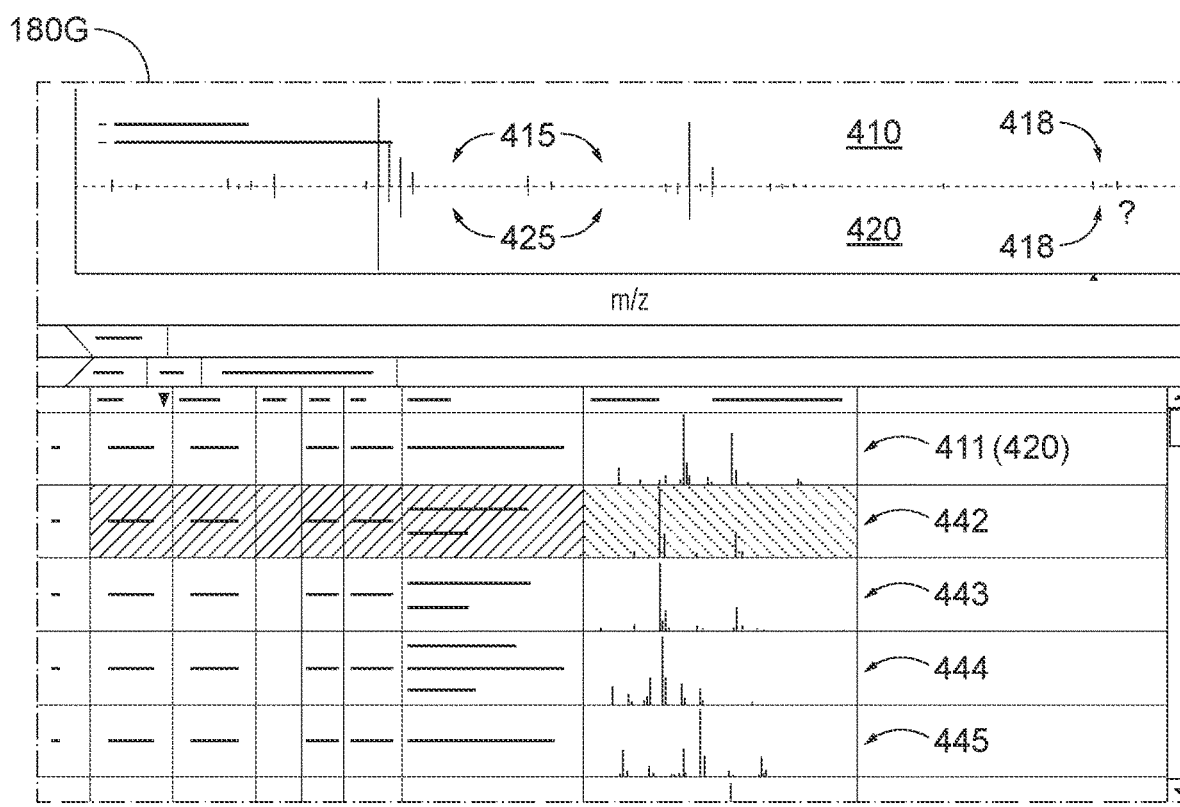
FIG. 7B is an illustration of a user interface showing a reference spectrum matching the sample spectrum of FIG. 7A.

FIG. 7B is an illustration of a user interface 180G, showing an unshifted reference spectrum 420 matching the sample spectrum 410 of FIG. 7A. Although the total mass peaks 418, 428 may or may not be clear in either the sample spectrum 410, or the reference spectrum 420, the estimated mass value appears to have been accurate. The reference peaks 425 of the selected reference spectrum 420 provide a good (suitable or improved) match to the corresponding sample peaks 415 in the sample spectrum 410, reflected in the high value of the hit quality index (HQI), or other fit value.

FIG. 7B also provides a comparison of the reference spectrum 420 at 441 (upright), together with a ranked listing 440 including a number of additional sample spectrum "hits" 442, 443, 444, 445; e.g., with relatively higher or lower similarity metric (based on the HQI or other fit value). These sample spectra can be selected at least in part based on the mas peaks in the sample spectrum, as well as the estimated or nominal total mass (or the exact value if known), or based on a total mass input by the user to the user interface. The selected reference spectra can also be used to test the adaptive technique, and to demonstrate confidence in the reliability of the results, for example when one of the reference spectra is known a priori to match the sample, or by comparing two identical reference spectra, or two reference spectra with a known group exchange, associated with a known ΔM.

Figure 8A:
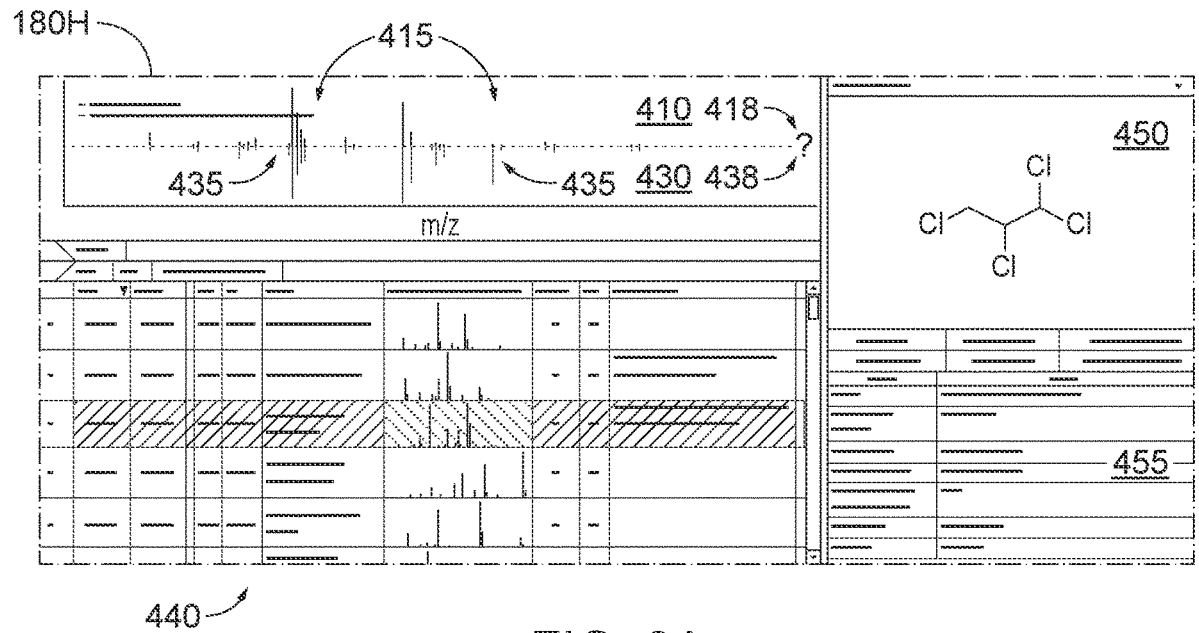
FIG. 8A is an illustration of a user interface showing a shifted reference spectrum matching the sample spectrum of FIG. 7A.

FIG. 8A is an illustration of a user interface 180H, showing a shifted reference spectrum 430 matching the sample spectrum 410 of FIG. 7A. In this particular example, the shifted reference spectrum 430 may be derived from one of a selected subset or ranked listing 440 of reference spectra; e.g., the second "hit" reference spectrum 442 of FIG. 7B, with peaks 435 shifted by a representative mass difference ΔM of 20 u. This corresponds to a group exchange in which a methyl group replaces a chlorine in the shifted reference spectrum 430, matching both the unknown sample spectrum 410, and the known (unshifted) reference spectrum 420 of FIG. 7B, which differs from the shifted reference by the same exchange value. Thus, the mass difference shifting technique can be used not only to identify unknown sample substances, but also for verification of the mass difference determination between known reference spectra.

Figure 8B:
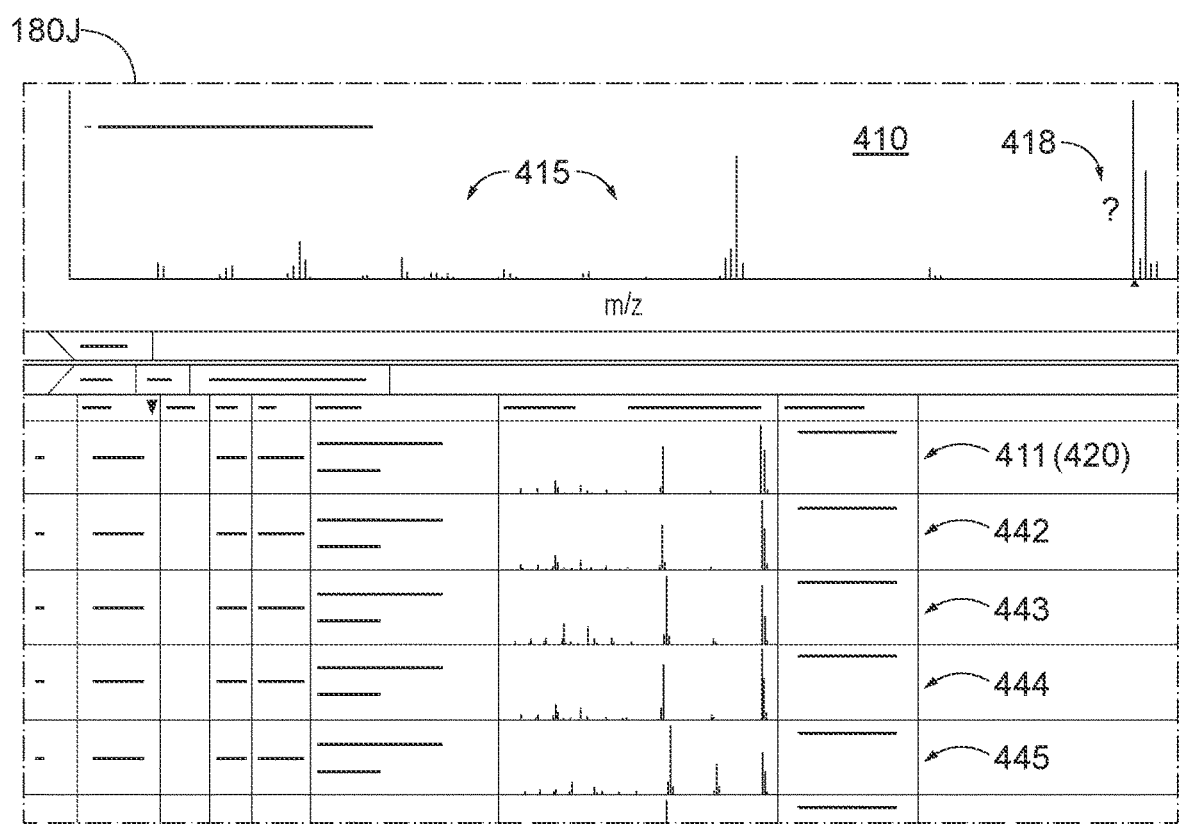
FIG. 8B is an illustration of a user interface showing a representative sample spectrum with selected reference spectra, based on user input.

FIG. 8B is an illustration of a user interface 180J, showing a representative sample spectrum 410 with selected reference spectrum 420 and 441 (upright), plus a selected subset or listing 440 of additional candidates or "hits" 442, 443, 444, 445; e.g., based on similarity metric, user input, or a combination thereof. For example, the interface can be configured for user input including information identifying the sample spectrum, or allowing the interface to access the sample spectrum. Depending on fit quality, additional user input can include an estimated or nominal total mass associated with the sample spectrum, or a mass difference (ΔM) associated with a candidate group exchange to be used when shifting peaks in the reference spectrum, for comparison to the sample spectrum peaks. The interface can also be configured to accept candidate references for the adaptive search, for example as identified by chemical name, CAS registry number, or other library or database reference.

In the example of FIG. 8B, there may or may not be a clear total mass peak 418. The user interface 180J is configured to allow the user to select group exchanges, either a priori or from a suggested listing, for example based on hydrogen ion ($H^+/H^-$) or metallic ion ($NA^+$) substitutions.

In the particular case of FIG. 8B, the adaptive analysis may return, in response to the user input, a single selected reference spectrum 420 and 441 (upright), with a relatively high fit value (e.g., HQI). A number of additional, different selected "hit" reference spectra 442, 443, 444, 445 can also be provided, with relatively higher or lower fit values. In each case, there are a number of relatively accurate mass "hits," where the sample spectra 441, 442, 443, 444, 445 match one or more of the reference peaks 415 in the reference spectrum 410. The user can then select among the different reference spectra 441, 442, 443, 444, 445; e.g., with each corresponding to a different group exchange.

Improved Search and Analysis

As can be seen from the above description and the examples set forth below, the present disclosure teaches improved methods for analysis of spectra produced by various mass spectroscopy systems. The methods include butterfly type displays that show the distribution of total mass and fragment mass values, and represent the abundance or magnitudes associated with these mass values appearing in the peaks of a sample spectrum, and in a selected reference spectrum, to be readily compared by a user of interface. In addition, the user interface facilitates use of various similarity metrics to calculate a degree of "fit" between various representations of the selected sample and reference spectra, such as a dot product of normalized vectors representing the peaks in each of the sample and reference spectra, or a convolution of corresponding spectral functions, or another metric such an earth mover's distance metric. The values resulting from using various similarity metrics to calculate the degree of "fit" can be displayed as part of the user interface, optionally with identification of the particular fit metric that is used.

Further, the user interface allows a user to see and select candidate values for a total mass of the sample substance, and a mass difference (ΔM) between selected peaks in a spectrum, and to display a revised sample spectrum or selected reference spectrum reflecting the application of an additive or subtractive adjustment to either spectrum, based on the ΔM value. Whether or not an improved fit is found by use of these operations directed at and delivered to the user interface (e.g., a fit which identifies one or more target molecules in a sample tested by mass spectroscopy, or merely a partial or close match), the degree of fit values and the display of ΔM adjusted spectra may allow the user to identify fragments for further adaptive searching or other analytic techniques, which allow for improved identification of the sample molecule, or fragments of the sample molecule that are of interest.

User Interface

Figure 9:
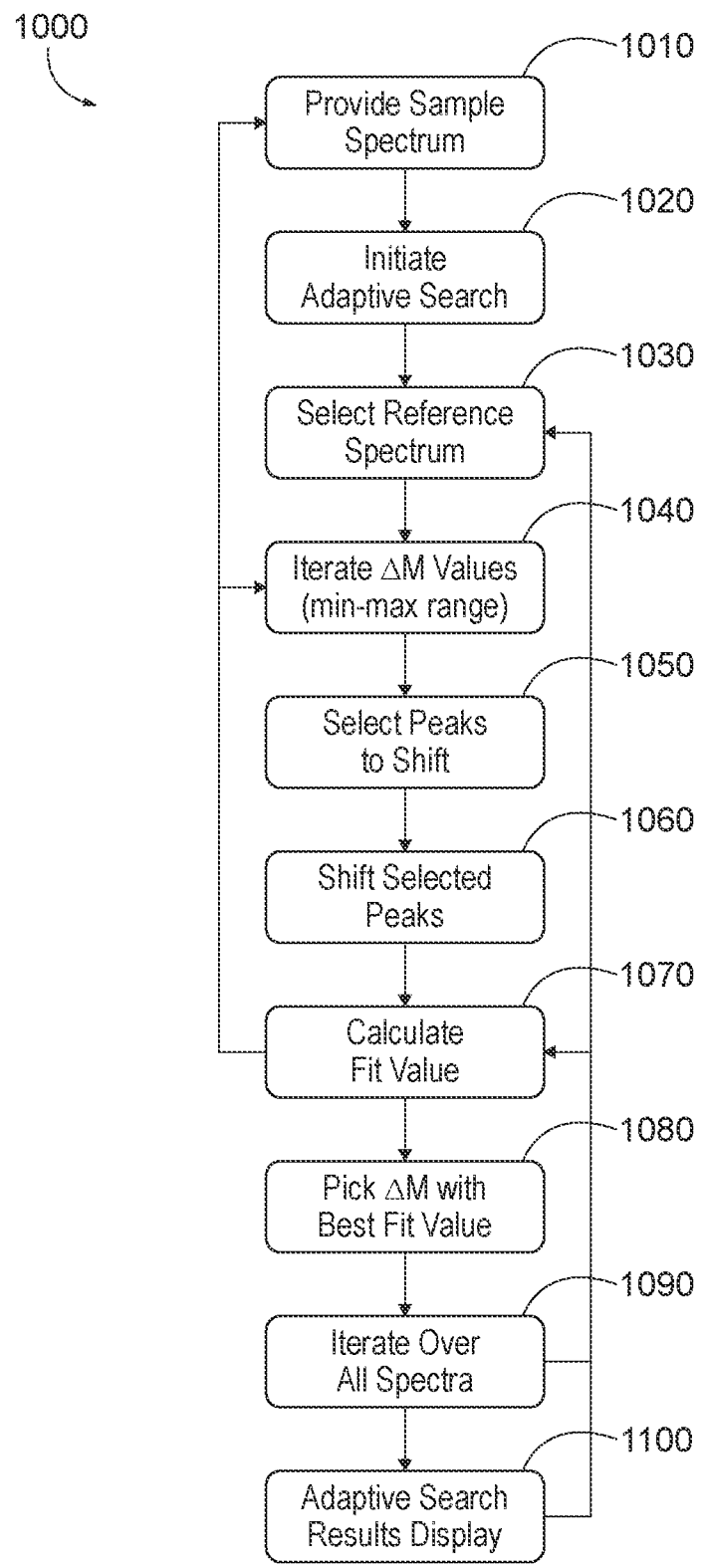
FIG. 9 is a chart showing process flow steps in an adaptive search, starting with a sample spectrum and seeking candidate matches in a library of reference spectra.

FIG. 9 is a chart showing process flow steps in an adaptive search method 1000, starting with a sample spectrum and seeking candidate matches in a library of reference spectra. As shown in FIG. 9, process or method 1000 encompasses one or more steps including, but not limited to, the following. Among these steps are certain user input actions and displays of search results, which can be performed on or by a computer-based system or user interface in any order or combination, with or without additional analytical steps.

Provide a sample spectrum (step 1010), as an object of the adaptive search method (1000). For example, the user interface can be configured for receiving the sample spectrum and for displaying the sample spectrum on a user interface (UI); e.g., a graphical user interface (GUI) 180, as described herein.

Initiate an adaptive search (step 1020). If available, initiating the adaptive search can be based on a molecular ion mass determined from or provided with the sample spectrum (step 1025). If no molecular ion mass is determined from or provided with the sample spectrum, initiating the adaptive search can be based on a molecular ion mass or mass range determined from or provided with a set of sample spectrum peaks, or a user-defined molecular ion mass.

Select a reference spectrum (or another reference spectrum) (step 1030). For example, one or more candidate reference spectra can be selected from a library, database, or other set of reference spectra, for comparison to the sample spectrum. At successive iterations of the method, other reference spectra can be selected from the set, until all candidates have been considered.

Iterate delta mass (ΔM) values (step 1040). The user interface can be configured to iterate potential ΔM values over a minimum to maximum (min-max) range or to use a predefined range such as −200 to +200 AMU. Alternatively the ΔM values may range from ±1 AMU to ±100 AMU, from ±1 AMU to ±200 AMU, or more or less. Alternatively, the interface can calculate, estimate or otherwise determine potential ΔM values based on selected peaks representing fragment masses in the sample and reference spectra.

Select peaks to shift (step 1050). For example, peaks can be selected based on overlap between the shifted reference spectrum and the original spectrum. Where there is overlap, this may indicate that shifting the selected peak may improve the fit value. Depending on application, the ΔM values can represent differences in mass between two atoms or molecular groups, which can be exchanged to shift one or more reference peaks toward or onto a sample peak, and/or to make one or more of the reference spectra provide a better fit (higher fit value), when compared to the sample spectrum.

Shift selected peaks (step 1060). For example, the user interface can be configured to shift one or more of the selected peaks in the reference spectrum by the delta mass (ΔM) value.

Calculate a fit value (step 1070). For example, the user interface can be configured to calculate the fit value based on a numerical comparison between the sample spectrum and a selected reference spectrum, with the set of selected peaks shifted by the particular ΔM value used by the current iteration.

Pick delta mass (ΔM) with best fit value (step 1080). For example, the user interface can be configured to pick the ΔM value with the best (e.g., highest) fit value and to use it as the best match between the sample spectrum and the selected reference spectrum. The user interface can also be configured to display the ΔM with the best calculated fit value, and to identify or display a molecular group associated with the delta mass (ΔM) value.

Iterate over all spectra (step 1090). For example, the process or method 1000 can be repeated to select another reference spectrum from the candidate set (step 1030), until all reference spectra in the set have been analyzed. In successive iterations, the user interface can also be configured to recalculate the fit value using a different delta mass (ΔM), or by selecting different peaks to shift, or both.

Adaptive display of search results (step 1100). For example, the user interface can be configured to display search results including the sample spectrum and one or more candidate reference spectra; e.g., in a hit list (or similar subset of selected reference spectra), ranked by fit value. The user interface can also be configured for displaying one or more selected reference spectra; e.g., with peaks shifted based on the adaptive search results. The user interface can also be configured to display the sample and reference spectra using dotted lines or other indicia to identify the shifted peaks. The interface can also be adapted for user input, as described herein, and for updating any of the search results, sample spectrum, candidate reference spectra, hit list, or shifted peaks, based on the user input.

Depending on application, for example, one or more of the reference spectra in the ranked listing ("hit list") may be identified as a fit for the sample spectrum, with or without shifted peaks. One or more of the reference spectra may also be rejected as not being a good fit (e.g., either by the user, or by the user interface itself), and/or one or more additional reference spectra may be added to the hit list (or similar ranked subset), based on the corresponding fit value.

The process or method 1000 can be repeated by providing a new sample spectrum for analysis (step 1010), and then performing the method again, to display new or updated results (1100). Alternatively, displaying the results (step 1100) can be performed at any point during the method (1000), or the method can proceed from displaying the results (step 1100) to any of the steps between initiating the adaptive search (step 1020) and picking the ΔM with the best fit value (step 1080), inclusive, before iterating over all the spectra (step 1090).

A computer-based user interface (e.g., interface 180 of FIG. 1) or system (e.g., system 100 of FIG. 1 or system 300 of FIG. 3) can be provided for performing the method or process 1000, including interactions with a user who is seeking to find candidate reference spectra that might be identical to or a close match with a sample spectrum of an unknown composition, as described herein. The user interface allows the user to input a sample spectrum and to control various system actions to locate candidates for matching reference spectra by comparing the sample spectrum to the reference spectra for known molecules collected in libraries. With input available in the form of a sample spectrum, the user can initiate a search for reference spectra based on similarity, with output returned in a display at the user interface that includes a ranked subset of reference spectra that are match or near-match candidates.

The user interface process or method can also be performed in combination with method 200 of FIG. 2, for adaptive search mass spectrometer spectral analysis. Based on the candidates returned from the adaptive search, including information regarding fragments appearing in a reference spectrum that comprise certain chemical groups, the user can adapt the search strategy by effecting a mass shift (ΔM) for the fragments as represented by mass peaks in the candidate reference spectrum. The shifted peaks in the spectrum can be the basis for a calculation or iterative recalculation of the fit value, relative the sample spectrum. The fit value may be improved in the recalculation, and in particular may be sufficiently improved so that the reference spectrum, as shifted, can be a strong candidate for identification of the unknown composition of the sample spectrum.

EXAMPLES

A method comprises identifying or otherwise ascertaining a set of sample peaks in a sample spectrum; e.g., where the sample peaks are associated with fragments of a sample, each having a sample fragment mass, and selecting a reference spectrum having a set of reference peaks associated with fragments of a reference, each having a reference fragment mass determining a mass difference between a selected sample peak in the sample spectrum, as compared to a selected reference peak in the reference spectrum. The method can also include selecting a group exchange based on the mass difference, where the group exchange represents a change in the sample fragment mass associated with the selected sample peak, as compared with the reference fragment mass associated with the selected reference peak, shifting the selected sample peak or the selected reference peak by the mass difference, and determining a fit value for the sample spectrum with respect to the reference spectrum; e.g., where the fit value characterizes similarity between the respective sets of sample and reference peaks, including the shifted sample or reference peak, responsive to the group exchange.

The method, where the sample spectrum is obtained from a mass spectrometer system; e.g., further comprising outputting one or both of the sample spectrum and the reference spectrum to a user interface.

The method, further comprising outputting a total mass value to the user interface, where the total mass value is determined based on the sample peaks in the sample spectrum; e.g., where the total mass value is used to select the reference spectrum, to determine the mass difference, or to select the group exchange.

The method, further comprising receiving input from the user interface; e.g., where the user input is used to update or change the total mass value.

The method, further comprising outputting one or more of the fit value and the selected group exchange to the user interface, and receiving input from the user interface; e.g., where the input determines the selected group exchange.

The method, further comprising outputting a set of one or more suggested group exchanges to the user interface; e.g., where the input determines the selected group exchange from among the set of suggested group exchanges.

The method, where the group exchange represents the exchange of a group of atoms in the molecular fragment associated with the selected sample peak with a different group of atoms in the molecular fragments associated with the selected reference peak.

The method, where the group exchange represents the exchange of the molecular fragments associated with the selected sample peak with the molecular fragments associated with the selected reference peak.

The method, further comprising shifting one or more additional sample peaks in the sample spectrum or one or more reference peaks in the reference spectrum by the mass difference; e.g., where the fit value characterizes similarity between the respective sample and reference spectra, including the one or more additional shifted sample or reference peaks, responsive to additional instances of the group exchange.

The method, further comprising selecting one or more additional group exchanges representing one or more additional mass differences between the sample fragment masses associated with the sample peaks, as compared with the reference fragment masses associated with the reference peaks. The method, further comprising shifting one or more additional sample peaks or one or more additional reference peaks by the respective one or more additional mass differences; where the fit value characterizes similarity between the respective sample and reference spectra, including the one or more additional shifted sample or reference peaks, responsive to the one or more additional group exchanges.

The method, where the sample peaks are associated with molecular fragments of the sample and the reference peaks are associated with molecular fragments of the reference.

A system comprises memory, a computer processor and an interface in data communication with a library of reference spectra. The memory can comprise a non-transitory machine-readable data storage medium with computer code stored on it, where the computer code is executable by the processor to perform a method according to any of the above examples.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

The invention claimed is:

1. A computer-based method of mass spectroscopy analysis, the method comprising:
   identifying a set of sample peaks in a sample spectrum, wherein the sample spectrum comprises a sample mass spectrometer spectrum and the sample peaks are associated with fragments of a sample, each having a sample fragment mass;
   selecting a reference spectrum having a set of reference peaks associated with fragments of a reference, each having a reference fragment mass;
   determining a mass difference between a selected sample peak in the sample spectrum, as compared to a selected reference peak in the reference spectrum;
   selecting a group exchange based on the mass difference, wherein the group exchange represents a change in the sample fragment mass associated with the selected sample peak, as compared with the reference fragment mass associated with the selected reference peak;
   shifting the selected sample peak or the selected reference peak by the mass difference;
   determining a fit value for the sample spectrum with respect to the reference spectrum, wherein the fit value characterizes similarity between the respective sets of sample and reference peaks, including the shifted sample or reference peak, responsive to the group exchange;
   outputting one or both of the sample spectrum and the reference spectrum to a user interface; and
   updating the fit value on the user interface, responsive to the group exchange
   outputting a total mass value to the user interface, wherein the total mass value is determined based at least in part on the sample peaks in the sample spectrum; and
   selecting one or more of the reference spectrum, the mass difference, or the group exchange for display on the user interface, based at least in part on the total mass value.

2. The method of claim 1, further comprising updating the total mass value based on user input received via the user interface.

3. The method of claim 1, further comprising outputting a set of one or more suggested group exchanges to the user interface, wherein the group exchange is selected from among the set of suggested group exchanges based on user input received via the user interface.

4. The method of claim 1, wherein the group exchange represents exchange of a group of atoms in one of the sample fragments with a different group of atoms in one of the reference fragments.

5. The method of claim 1, wherein the group exchange represents exchange of one or all atoms in one of the sample fragments associated with the selected sample peak with one or all atoms in one of the reference fragments associated with the selected reference peak.

6. The method of claim 1, further comprising:
   shifting one or more additional sample peaks in the sample spectrum or one or more reference peaks in the reference spectrum by the mass difference;
   wherein the fit value characterizes similarity between the respective sample and reference spectra, including the one or more additional shifted sample or reference peaks, responsive to shifting the one or more additional peaks.

7. A computer-based method of mass spectroscopy analysis, the method comprising:
   identifying a set of sample peaks in a sample spectrum, wherein the sample spectrum comprises a sample mass spectrometer spectrum and the sample peaks are associated with fragments of a sample, each having sample fragment mass;
   selecting a reference spectrum having a set of reference peaks associated with fragments of a reference, each having a reference fragment mass;
   determining a mass difference between a selected sample peak in the sample spectrum, as compared to a selected reference peak in the reference spectrum;
   selecting a group exchange based on the mass difference, wherein the group exchange represents a change in the sample fragment mass associated with the selected sample peak, as compared with the reference fragment mass associated with the selected reference peak;
   shifting the selected sample peak or the selected reference peak by the mass difference;
   determining a fit value for the sample spectrum with respect to the reference spectrum, wherein the fit value characterizes similarity between the respective sets of sample and reference peak, including the shifted sample or reference peak, responsive to the group exchange;
   outputting one or both of the sample spectrum and the reference spectrum to a user interface;
   selecting one or more additional group exchanges representing one or more additional mass differences between one or more of the sample fragment masses associated with the sample peaks, as compared with one or more of the reference fragment masses associated with the reference peaks; and shifting one or more additional sample peaks or one or more additional reference peaks by the respective one or more additional mass differences;

wherein the fit value characterizes similarity between the respective sample and reference spectra, including the one or more additional shifted sample or reference peaks, responsive to the one or more additional group exchanges.

8. A user interface having a processor configured to perform a method according to claim 1, in data communication with a data library comprising a plurality of one or more such reference spectra.

9. The user interface of claim 8, further configured for displaying a subset of the identified reference spectra selected based on the respective fit values, wherein one or more of:

the subset comprises an interactive list of the identified reference spectra, ranked or listed based on the respective fit values;

the user interface is configured for updating the respective fit values responsive to the mass difference;

the user interface is configured for updating the subset responsive to updating the respective fit values; or the user interface is configured for updating the subset responsive to user input.

10. A non-transitory machine-readable data storage medium with computer code stored thereon, the computer code executable by a computer processor to perform a method according to claim 1.

11. A computer-based mass spectroscopy analysis system, comprising:

a processor and memory adapted for comparing a sample spectrum from a mass spectrometer with a set of reference spectra from a library thereof, wherein the sample and reference spectra each comprise a plurality of peaks representing fragment masses of respective fragments;

a user interface in communication with the processor, the user interface configured for:

displaying the sample spectrum;

identifying one or more of the reference spectra from the library based on a similarly or fit metric selected to identify same or similar fragment masses in the sample and reference spectra, wherein the similarity or fit metric is further selected to identify a same or similar total mass associated with one or more of the peaks in the respective sample and reference spectra;

displaying one or more of the identified reference spectra with the sample spectrum;

shifting one or more of the peaks in the displayed sample or reference spectrum by a change in mass value corresponding to a group exchange in the respective fragment;

selecting or updating the total mass;

identifying the one or more reference spectra based on the selected or updated total mass; and updating the respective similarly or fit metric accordingly, based on the one or more shifted peaks.

12. The system of claim 11, wherein the user interface is configured for juxtaposing the sample and reference spectra along a respective mass scale.

13. The system of claim 12, wherein the user interface is configured for representing original and shifted positions of the one or more peaks along the respective mass scale, identified or linked via one or more indicia.

14. The system of claim 11, wherein the similarity or fit metric is selected from a group comprising a dot product, a convolution, a cross-correlation, a likelihood function, and an earth mover metric, operating on amplitudes of the respective peaks representing the fragment masses.

15. The system of claim 11, wherein the user interface is configured for selecting the change in mass value corresponding the group exchange, or updating the change in mass value corresponding to a different group exchange.

16. The system of claim 15, wherein the user interface is configured for shifting the one or more peaks by the selected or updated change in mass value, and for updating the respective similarity or fit metric accordingly.

17. The system of claim 11, wherein the user interface is configured for selecting or updating the change in mass value, shifting one or more of the peaks in the displayed sample or reference spectrum by the selected or updated change in mass value, and updating the respective similarly or fit metric accordingly.

18. The system of claim 11, wherein the user interface is configured for displaying a subset of the identified reference spectra selected based on the respective similarity or fit metrics, wherein one or more of:

the subset comprises an interactive list of the identified reference spectra, ranked or listed based on the respective similarity or fit metrics;

the user interface is configured for updating the respective similarity or fit metrics responsive to the change in mass value;

the user interface is configured for updating the subset responsive to updating the respective similarly or fit metrics; or the user interface is configured for updating the subset responsive to user input.

19. The system of claim 11, wherein the user interface is configured for selecting one or more of the peaks to be shifted.

20. The system of claim 11, wherein the user interface is configured for selecting the group exchange corresponding to the change in mass value.

* * * * *